(12) United States Patent
Kim et al.

(10) Patent No.: US 10,379,315 B2
(45) Date of Patent: Aug. 13, 2019

(54) CAMERA MODULE

(71) Applicant: Samsung Electro-Mechanics Co., Ltd., Suwon-si (KR)

(72) Inventors: Yoo Chang Kim, Suwon-si (KR); Byung Gi An, Suwon-si (KR); Po Chul Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 110 days.

(21) Appl. No.: 15/717,696

(22) Filed: Sep. 27, 2017

(65) Prior Publication Data

US 2018/0100986 A1 Apr. 12, 2018

(30) Foreign Application Priority Data

Oct. 12, 2016 (KR) .................. 10-2016-0131971

(51) Int. Cl.
*G02B 7/04* (2006.01)
*G02B 7/10* (2006.01)
(Continued)

(52) U.S. Cl.
CPC .............. *G02B 7/04* (2013.01); *G02B 7/10* (2013.01); *G03B 3/10* (2013.01); *H04N 5/2252* (2013.01); *H04N 5/2253* (2013.01); *H04N 5/2254* (2013.01); *H04N 5/2257* (2013.01); *H04N 5/2258* (2013.01); *G03B 2205/0069* (2013.01); *H04N 5/23212* (2013.01)

(58) Field of Classification Search
CPC . G02B 7/02; G02B 7/021; G02B 7/04; G02B 7/08; G02B 7/09; G02B 7/10; G02B 7/102; H04N 5/2251–5/2254; H04N 5/2257; H04N 5/2258; H04N 5/23212; H04N 5/23287; G03B 3/10; G03B 3/12; G03B 5/00; G03B 13/00; G03B 13/32; G03B 13/34; G03B 13/36; G03B 17/00; G03B 17/12; G03B 2205/0069; G03B 2205/0007
USPC ....... 359/811, 814, 823, 824, 557, 694–696; 348/335, 345, 374; 396/55, 79, 80, 87, 396/89
See application file for complete search history.

(56) References Cited

U.S. PATENT DOCUMENTS

| 7,893,992 B2 * | 2/2011 | Vittu | G03B 13/36 348/357 |
| 8,279,541 B2 * | 10/2012 | Henderson | G02B 7/022 359/811 |

(Continued)

FOREIGN PATENT DOCUMENTS

| JP | 2005-31466 A | 2/2005 |
| KR | 10-2009-0022672 A | 3/2009 |

(Continued)

*Primary Examiner* — Loha Ben
(74) *Attorney, Agent, or Firm* — NSIP Law

(57) ABSTRACT

A camera module includes a housing; a first lens module and a second lens module accommodated in the housing; a printed circuit board attached to the housing; an actuator disposed between the first and second lens modules and the housing and configured to move the first and second lens modules in an optical axis direction; and a single integrated circuit disposed on the printed circuit board and configured to control movements of the first and second lens modules.

20 Claims, 5 Drawing Sheets

(51) Int. Cl.
*G03B 3/10* (2006.01)
*H04N 5/225* (2006.01)
*H04N 5/232* (2006.01)

(56) References Cited

U.S. PATENT DOCUMENTS

| | | | | |
|---|---|---|---|---|
| 8,582,017 | B2* | 11/2013 | Seol | G02B 7/08 |
| | | | | 348/345 |
| 8,810,714 | B2* | 8/2014 | Seol | G02B 7/08 |
| | | | | 348/345 |
| 8,995,241 | B1* | 3/2015 | Heo | G02B 7/023 |
| | | | | 369/44.14 |
| 9,995,904 | B2* | 6/2018 | Lee | G02B 7/28 |
| 2013/0258172 | A1 | 10/2013 | Seol et al. | |
| 2016/0219222 | A1* | 7/2016 | Heo | H04N 5/23287 |

FOREIGN PATENT DOCUMENTS

| | | |
|---|---|---|
| KR | 10-1314652 B1 | 10/2013 |
| KR | 10-2015-0113675 A | 10/2015 |
| KR | 10-2016-0005927 A | 1/2016 |
| KR | 10-2016-0103680 A | 9/2016 |

* cited by examiner

CAMERA MODULE

CROSS-REFERENCE TO RELATED APPLICATIONS

This application claims the benefit under 35 USC 119(a) of Korean Patent Application No. 10-2016-0131971 filed on Oct. 12, 2016, in the Korean Intellectual Property Office, the entire disclosure of which is incorporated herein by reference for all purposes.

BACKGROUND

1. Field

This application relates to a camera module.

2. Description of Related Art

Camera modules have become a standard feature in mobile communications terminals such as tablet personal computers (PC) and laptop computers, as well as in smartphones.

A dual camera in which two lens modules are mounted recently has been developed, and such a dual camera has been designed to only have a form in which two independent camera modules are simply disposed in parallel, that is side-by-side.

However, a dual camera designed in such a manner is vulnerable to deformation by an external impact or other damage, such that additional reinforcement by a reinforcing member may be needed.

In addition, since the dual camera module has the form in which the two independent camera modules are simply disposed in parallel, there is a limitation on reducing a size of the dual camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing; a first lens module and a second lens module accommodated in the housing; a printed circuit board attached to the housing; an actuator disposed between the first and second lens modules and the housing and configured to move the first and second lens modules in an optical axis direction; and a single integrated circuit disposed on the printed circuit board and configured to control movements of the first and second lens modules.

The camera module may further include a substrate attached to a side surface of the housing; and a first position sensor and a second position sensor disposed on one surface of the substrate and configured to sense positions of the first and second lens modules, respectively.

The single integrated circuit may be further configured to control magnitudes of currents applied to the actuator based on the positions of the first and second lens modules sensed, respectively, by the first and second position sensors.

The side surface of the housing to which the substrate is attached may be a side surface of the housing having a greatest length among surfaces of the housing.

The actuator may include a first magnet attached to one side surface of the first lens module; a second magnet attached to one side surface of the second lens module; and a first coil and a second coil disposed on one surface of the substrate facing the first and second magnets, respectively.

The camera module may further include a yoke disposed on another surface of the substrate and configured to generate an attractive force in a direction perpendicular to the optical axis direction in cooperation with the first and second magnets.

The camera module may further include ball members disposed between the first and second lens modules and the housing and configured to guide the movements of the first and second lens modules.

The first and second lens modules may have different fields of view.

A shortest distance between an optical axis of the first lens module and an optical axis of the second lens module may be less than a width of the housing.

The camera module may further include a first image sensor and a second image sensor disposed on the printed circuit board; wherein the single integrated circuit may be disposed on the printed circuit board between the first image sensor and the second image sensor.

In another general aspect, a camera module includes a housing; lens modules accommodated in the housing; a substrate attached to the housing; an actuator including magnets attached to the lens modules, respectively, and coils disposed on the substrate facing the magnets, respectively; and a single controller disposed on the substrate between the coils and configured to control movements of the lens modules.

The camera module may further include position sensors disposed on the substrate and configured to sense positions of the lens modules, respectively.

The single controller may be further configured to control magnitudes of currents applied to the coils based on the positions of the modules sensed, respectively, by the position sensors.

The single controller may be an integrated circuit in which a driver integrated circuit (IC) configured to apply driving signals to the coils, and position sensors configured to sense positions of the lens modules, are configured as a single chip.

The magnets may be disposed so that portions of the magnets face the single controller in a direction perpendicular to an optical axis direction.

In another general aspect, a camera module includes a housing; a first lens module and a second lens module supported by the housing so that the first and second lens modules are independently movable in an optical axis direction; an actuator configured to independently move the first and second lens modules in the optical axis direction; and a single integrated circuit configured to control the actuator to independently move the first and second lens modules in the optical axis direction.

The actuator may include a first magnet disposed on a surface of the first lens module, a second magnet disposed on a surface of the second lens module, a first coil facing the first magnet, and a second coil facing the second magnet; and the camera module may further include a first position sensor configured to sense a position of the first lens module, and a second position sensor configured to sense a position of the second lens module; wherein the single integrated circuit may be further configured to apply a first driving signal to the first coil to move the first lens module in the optical axis direction based on the position of the first lens module sensed by the first position sensor, and apply a second driving signal to the second coil to move the second lens module in the optical axis direction based on the position of the second lens module sensed by the second position sensor.

The camera module may further include a substrate supported by the housing; wherein the single integrated circuit, the first coil, the second coil, the first position sensor, and the second position sensor may be disposed on the substrate.

The single integrated circuit, the first position sensor, and the second position sensor may integrated into a single chip.

The camera module may further include a substrate supported by the housing; and a printed circuit board supported by the housing; wherein the first coil, the second coil, the first position sensor, and the second position sensor may be disposed on the substrate; and the single integrated circuit may be disposed on the printed circuit board.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In this application, an optical axis direction is a vertical direction in relation to a first lens module 210 or a second lens module 230 placed on a horizontal surface. However, in more general terms, an optical axis direction is a direction perpendicular to a plane on which the first lens module 210 or the second lens module 230 is placed.

Figure 1:
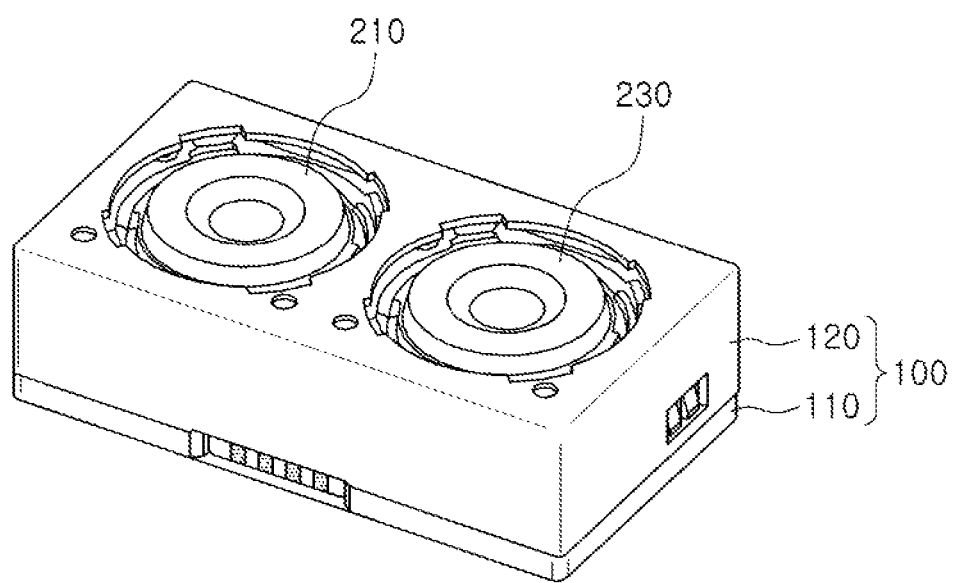
FIG. 1 is a perspective view illustrating an example of a camera module.
Figure 2:
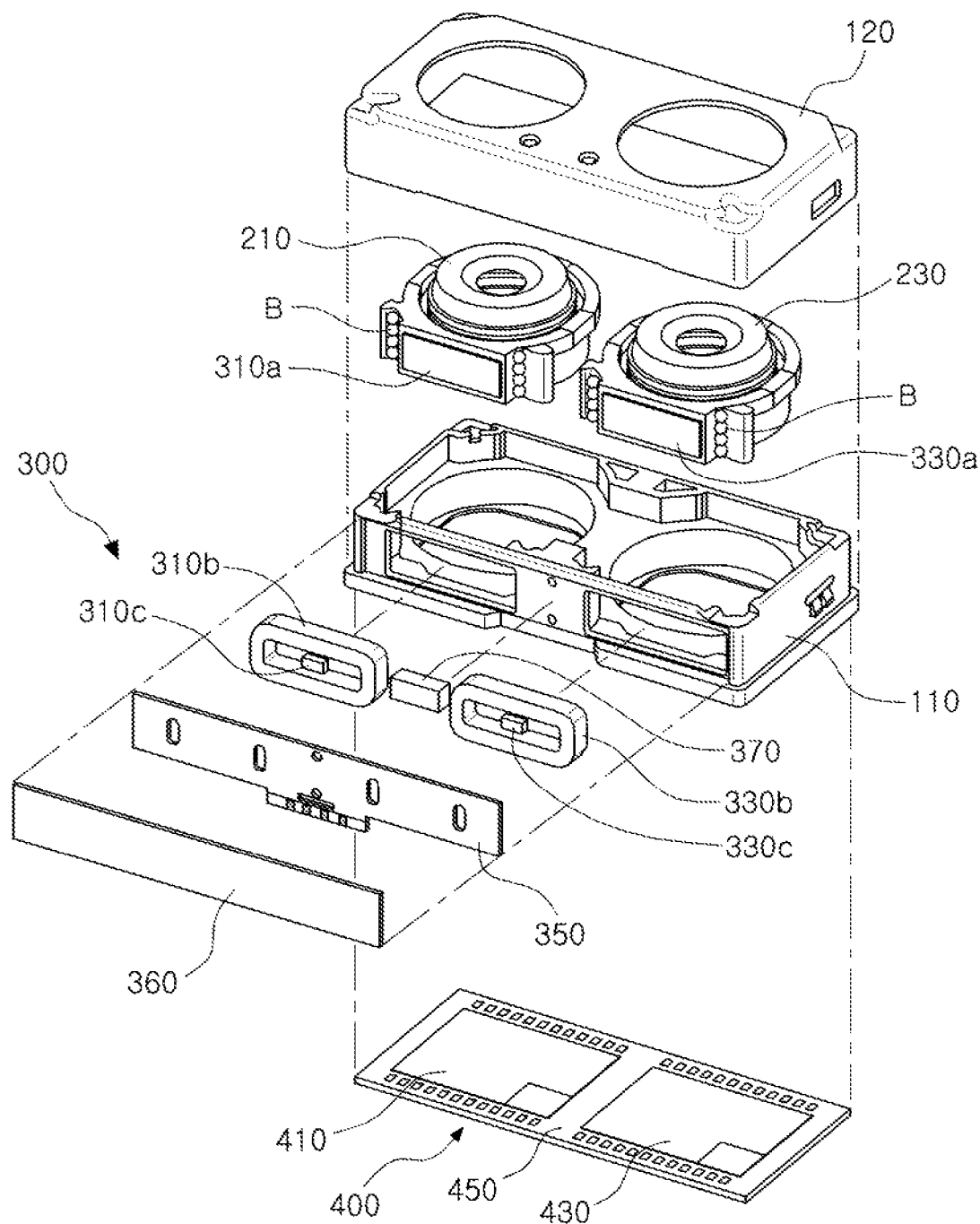
FIG. 2 is an exploded perspective view illustrating the example of the camera module of FIG. 1.

FIG. 1 is a perspective view illustrating an example of a camera module, and FIG. 2 is an exploded perspective view illustrating the example of the camera module of FIG. 1.

Referring to FIGS. 1 and 2, the camera module includes lens modules 210 and 230 that are independently movable, a housing 100 accommodating the lens modules 210 and 230 therein, and an actuator 300 for moving each of the lens modules 210 and 230 in an optical axis direction.

In the example in FIGS. 1 and 2, the camera module includes a first lens module 210, a second lens module 230, a housing 100 accommodating the first and second lens modules 210 and 230 therein, an actuator 300 for moving the first and second lens modules 210 and 230 in the optical axis direction, and an image sensor module 400 for converting light incident thereon through the first and second lens modules 210 and 230 into electrical signals.

The first lens module 210 and the second lens module 230 include respective lens barrels, and the respective lens barrels have a cylindrical shape so that lenses for capturing an image of a subject may be accommodated therein. The lenses are disposed on an optical axis.

The first lens module 210 and the second lens module 230 are accommodated in the housing 100 to be movable in the optical axis direction. In addition, the first lens module 210 and the second lens module 230 are independently movable.

The first lens module 210 and the second lens module 230 may have different fields of view.

In one example, one of the first lens module 210 and the second lens module 230 has a relatively wide field of view (i.e., is a wide angle lens), and the other one of the first lens module 210 and the second lens module 230 has a relatively narrow field of view (i.e., is a telephoto lens).

The first lens module 210 and the second lens module 230 may be designed to have different fields of view as described above, and thus may capture images of the subject at different depths of fields.

In addition, since a high-resolution image or a bright image may be generated using (for example, synthesizing) two images of one subject, an image of the subject may be clearly captured even in a low-light environment.

In addition, a three-dimensional (3D) image may be generated using a plurality of images, and a zoom function may also be implemented. In one example, the zoom function may be implemented by switching from one of the first lens module 210 and the second lens module 230 that is a wide angle lens to the other one of the first lens module 210 and the second lens module 230 that is a telephoto lens.

The housing 100 accommodates both of the first lens module 210 and the second lens module 230 therein, and two movement spaces are provided in the housing 100 so that the first lens module 210 and the second lens module 230 are independently movable.

The housing 100 includes a base 110 and a case 120 coupled to the base 110.

The base 110 has two optical path windows. Therefore, light passing through the first lens module 210 and the second lens module 230 through the two optical path windows is received by image sensors 410 and 430.

The case 120 is coupled to the base 110, and protects internal components of the camera module.

The image sensor module 400 is a device for converting the light passing through the first lens module 210 and the second lens module 230 into electrical signals, and may be attached to the housing 100.

In one example, the image sensor module 400 includes a printed circuit board 450 attached to the base 110, and a first image sensor 410 and a second image sensor 430 are connected to the printed circuit board 450.

In addition, the image sensor module 400 may further include an infrared filter (not shown in FIG. 2). The infrared filter cuts off light in an infrared region in the light incident thereto through the first and second lens modules 210 and 230.

The first and second image sensors 410 and 430 convert the light incident thereto through the first and second lens modules 210 and 230, respectively, into electrical signals. In one example, the first and second image sensors 410 and 430 are charge coupled devices (CODs). In another example, the first and second image sensors 410 and 430 are complementary metal-oxide-semiconductor devices (CMOSs).

The actuator 300 is a device for moving the first lens module 210 and the second lens module 230 in the optical axis direction.

The actuator 300 is disposed between the first and second lens modules 210 and 230 and the housing 100, and moves the first lens module 210 and the second lens module 230 in the optical axis direction to focus the first lens module 210 and the second lens module 230.

The actuator 300 first and second magnets 310a and 330a and first and second coils 310b and 330b to independently move the first lens module 210 and the second lens module 230.

When power is applied to the first and second coils 310b and 330b, the first lens module 210 and the second lens module 230 are moved in the optical axis direction by electromagnetic interaction between the first and second magnets 310a and 330a and the first and second coils 310b and 330b.

The first magnet 310a is attached to one side surface of the first lens module 210, and the second magnet 330a is attached to one side surface of the second lens module 230.

The first coil 310b is disposed facing the first magnet 310a in a direction perpendicular to the optical axis direction, and the second coil 330b is disposed facing the second magnet 330a in the direction perpendicular to the optical axis direction.

A substrate 350 is attached to the housing 100, and the first coil 310b and the second coil 330b are attached to the housing 100 by being mounted on the substrate 350.

In one example, the substrate 350 is attached to a side surface of the housing 100 having a greatest length among surfaces of the housing 100, and the first coil 310b and the second coil 330b are mounted on one surface of the substrate 350.

Ball members B are disposed between the first and second lens modules 210 and 230 and the housing 100 to guide movements of the first and second lens modules 210 and 230.

The ball members B are distributed in the optical axis direction, and move in a rolling motion when the first and second lens modules 210 and 230 move.

A yoke 360 generating an attractive force in the direction perpendicular to the optical axis direction in cooperation with the first magnet 310a and the second magnet 330a is provided on the other surface of the substrate 350. The yoke 360 may be made of a ferromagnetic material or any other material capable of generating an attractive force in cooperation with the first magnet 310a and the second magnet 330a.

Therefore, the ball members B are maintained in a state in which they are in contact with the first lens module 210, the second lens module 230, and the housing 100 due to the attractive force between the first and second magnets 310a and 330a and the yoke 360.

In the example in FIG. 2, the yoke 360 is one yoke disposed facing the first magnet 310a and the second magnet 330a in the direction perpendicular to the optical axis direction. However, the yoke 360 is not limited to this example. For example, a first yoke may be disposed facing the first magnet 310a, and a second yoke may be disposed facing the second magnet 330a.

A single controller 370 is disposed on the one surface of the substrate 350 between the first coil 310b and the second coil 330b.

The single controller 370 may be a driver integrated circuit (IC) (hereinafter referred to as a single integrated circuit 370) for applying power to the first coil 310b and the second coil 330b to control movement of the first lens module 210 and the second lens module 230, respectively.

Figure 3:
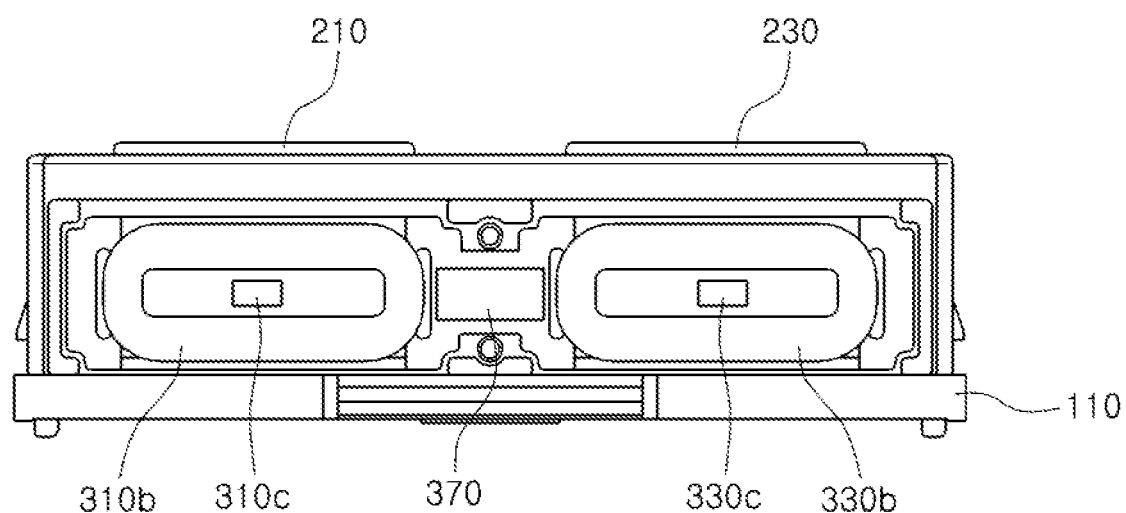
FIG. 3 is a schematic side view illustrating an example of a position of an integrated circuit in the camera module.

FIG. 3 is a schematic side view illustrating an example of a position of an integrated circuit in the camera module.

As illustrated in FIG. 3, the single integrated circuit 370 is positioned between the first coil 310b and the second coil 330. For clarity, the substrate 350 is not illustrated in FIG. 3, but the first coil 310b, the second coil 330b, and the single integrated circuit 370 are mounted on one surface of the substrate 350.

The camera module includes the single integrated circuit 370, and is configured so that movements of the lens modules (for example, the first lens module 210 and the second lens module 230) are controlled by the single integrated circuit 370.

When the lens modules are controlled by separate integrated circuits, connection structures between the integrated circuits, coils, and a substrate are complicated, and an overall size of a camera module is increased.

In one example, when there are separate integrated circuits separately controlling the lens modules, the number of pads connecting the printed circuit board 450 of the image sensor module 400 and the substrate 350 of the actuator 300 to each other are increased, and the number of operations of soldering the pads is also increased, thereby reducing a productivity of manufacturing the camera module.

However, in the camera module having the single integrated circuit 370, the movements of the first and second lens modules 210 and 230 are controlled by the single integrated circuit 370, and connection structures between the single integrated circuit 370, the first and second coils 310b and 330b, and the substrate 350 are simplified. In addition, costs required for manufacturing the camera module are reduced, and a productivity of manufacturing the camera module is improved.

In addition, the single integrated circuit 370 is disposed between the first and second coils 310b and 330b, thereby reducing the overall size of the camera module.

Figure 4:
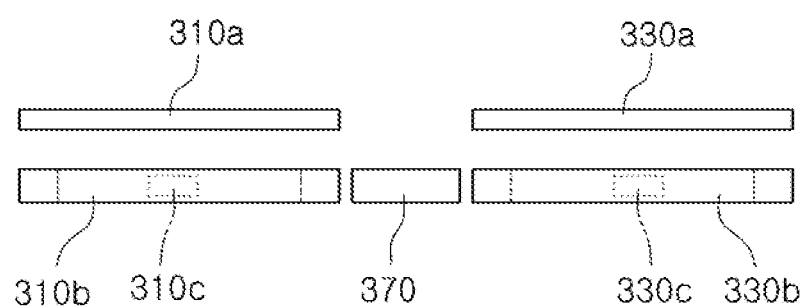
FIG. 4 is a schematic view illustrating an example of forms of magnets, coils, position sensors, and a single integrated circuit of the camera module when viewed in an optical axis direction.

FIG. 4 is a schematic view illustrating an example of forms of magnets, coils, position sensors, and a single integrated circuit of the camera module when viewed in an optical axis direction.

In one example, the camera module uses a closed loop control method of sensing and feeding back positions of the first and second lens modules 210 and 230.

Therefore, first and second position sensors 310c and 330c are provided to enable a closed loop control method to be performed. The first and second position sensors 310c and 330c may be Hall sensors.

The first and second position sensors 310c and 330c may be disposed inside or outside the first and second coils 310b and 330b, respectively.

In one example, the first and second position sensors 310c and 330c are mounted on the substrate 350 inside the first and second coils 310b and 330b, respectively, so that the first and second position sensors 310c and 330c are surrounded by the first and second coils 310b and 330b, respectively. Therefore, separate mounting spaces outside the first and second coils 310b and 330b for mounting the position sensors 310c and 330c are not required, thereby enabling the size of the camera module to be reduced.

The first and second position sensors 310c and 330c are provided to sense positions of the first and second lens modules 210 and 230, respectively. In one example, the first position sensor 310c senses a position of the first lens module 210, and a second position sensor 330c senses a position of the second lens module 230.

The first position sensor 310c senses the position of the first lens module 210 to which the first magnet 310a is attached, and the second position sensor 330c senses the position of the second lens module 230 to which the second magnet 330a is attached, through changes in magnetic flux densities of the first magnet 310a and the second magnet 330a, respectively.

The single integrated circuit 370 controls magnitudes of currents applied to the first and second coils 310b and 330b depending on the positions of the first and second lens modules 210 and 230 sensed, respectively, by the first and second position sensors 310c and 330c.

When the camera module is turned on, initial positions of the first and second lens modules 210 and 230 are sensed by the first and second position sensors 310c and 330c, respectively. In addition, the first and second lens modules 210 and 230 are moved from the sensed initial positions to initial setting positions. The sensed initial positions are positions of the first and second lens modules 210 and 230 in the optical axis direction when the camera module is turned on, and the initial setting positions are positions of the first and second lens modules 210 and 230 at which the first and second lens modules 210 and 230 are focused at infinity.

The first and second lens modules 210 and 230 are moved by driving signals of the single integrated circuit 370 from the initial setting positions to target positions at which the first and second lens modules 210 and 230 are focused on a subject.

In a focusing process, the first and second lens modules 210 and 230 may be moved forwards or backwards in the optical axis direction. That is, is, the first and second lens modules 210 and 230 may be moved in two directions in the focusing process.

Figure 5:
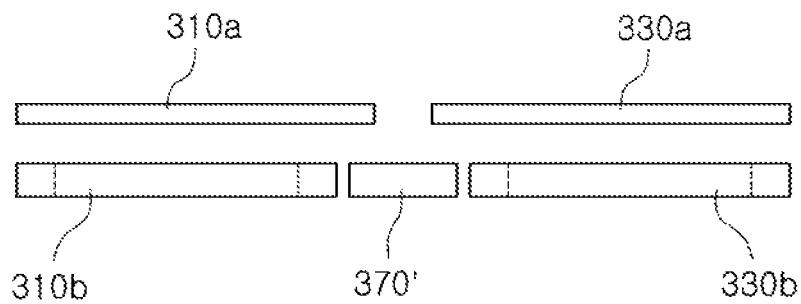
FIG. 5 is a schematic view illustrating another example of forms of magnets, coils, and a single integrated circuit of a camera module when viewed in an optical axis direction.

FIG. 5 is a schematic view illustrating another examples of forms of magnets, coils, and a single integrated circuit of a camera module when viewed in an optical axis direction.

In the example illustrated in FIG. 5, a single integrated circuit 370' is an integrated circuit in which a driver IC for applying driving signals to the first and second coils 310b and 330b, and position sensors for sensing positions of the first and second lens modules 210 and 230, are configured as a single chip.

Therefore, in the example illustrated in FIG. 5, separate position sensors are not needed as they are in the example illustrated in FIG. 4.

Since the separate position sensors are not needed in the example of the camera module illustrated in FIG. 5, a number of turns of the first and second coils 310b and 330b may be increased to increase a driving force for moving the first and second lens modules 210 and 230.

In the example illustrated in FIG. 5, the first and second magnets 310a and 330a are disposed so that portions of the first and second magnets 310a and 330a face the single integrated circuit 370' in a direction perpendicular to the optical axis direction.

Figure 6:
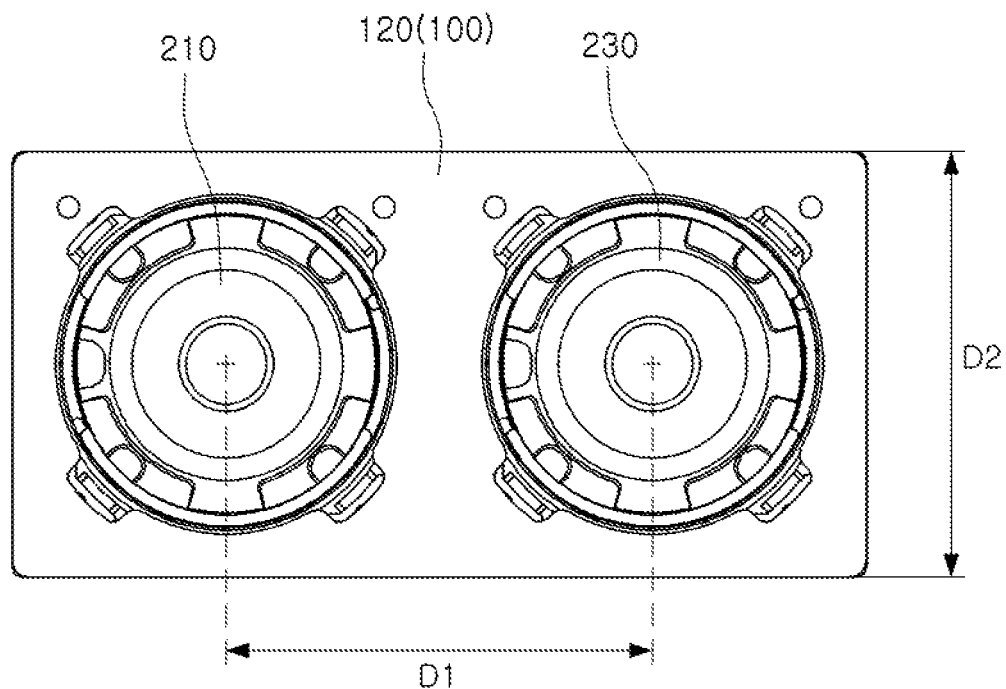
FIG. 6 is a plan view illustrating an example of a distance between optical centers of two lens modules and a width of a housing in a camera module.

FIG. 6 is a plan view illustrating an example of a distance between optical centers of two lens modules and a width of a housing in a camera module.

Referring to FIG. 6, a distance D1 between an optical center of the first lens module 210 and an optical center of the second lens module 230 measured in a length direction of the housing 100 is less than a width D2 of the housing 100 measured in a direction perpendicular to the length direction.

In addition, a shortest distance D1 between an optical axis of the first lens module 210 and an optical axis of the second lens module 230 is smaller than the width D2 of the housing 100. The optical axes of the first and second lens modules 210 and 230 are perpendicular to the plane of FIG. 6. When the first and second lens modules in FIG. 6 are viewed in a side view, similar to the side view in FIG. 3, the optical axes extend in the vertical direction parallel to each other. The shortest distance D1 between the optical axes may be measured along any line that is perpendicular to both of the optical axes.

In the context of FIG. 6, the optical centers of the first and second lens modules 210 and 230 are points on the optical axes of the first and second lens modules 210 and 230, and are denoted by the cross marks in the center of the first and second lens modules 210 and 230. The width D2 of the housing 100 is a length of a shortest side of the housing 100 in the plan view of FIG. 6.

In order to generate a high-resolution image or a bright image using two images captured by two lens modules, a distance between optical centers of the two lens modules needs to be relatively small.

In one example, when the distance between the optical centers of the two lens modules is relatively large, two images captured of one subject are sufficiently different from one another due to parallax that it may be difficult to generate the high-resolution image or the bright image.

Therefore, in the example of the camera module illustrated in FIG. 6, the distance D1 between the optical center of the first lens module 210 and the optical center of the second lens module 230 is smaller than the width D2 of the housing 100 to make it possible to generate various images using two images of one subject.

Figure 7:
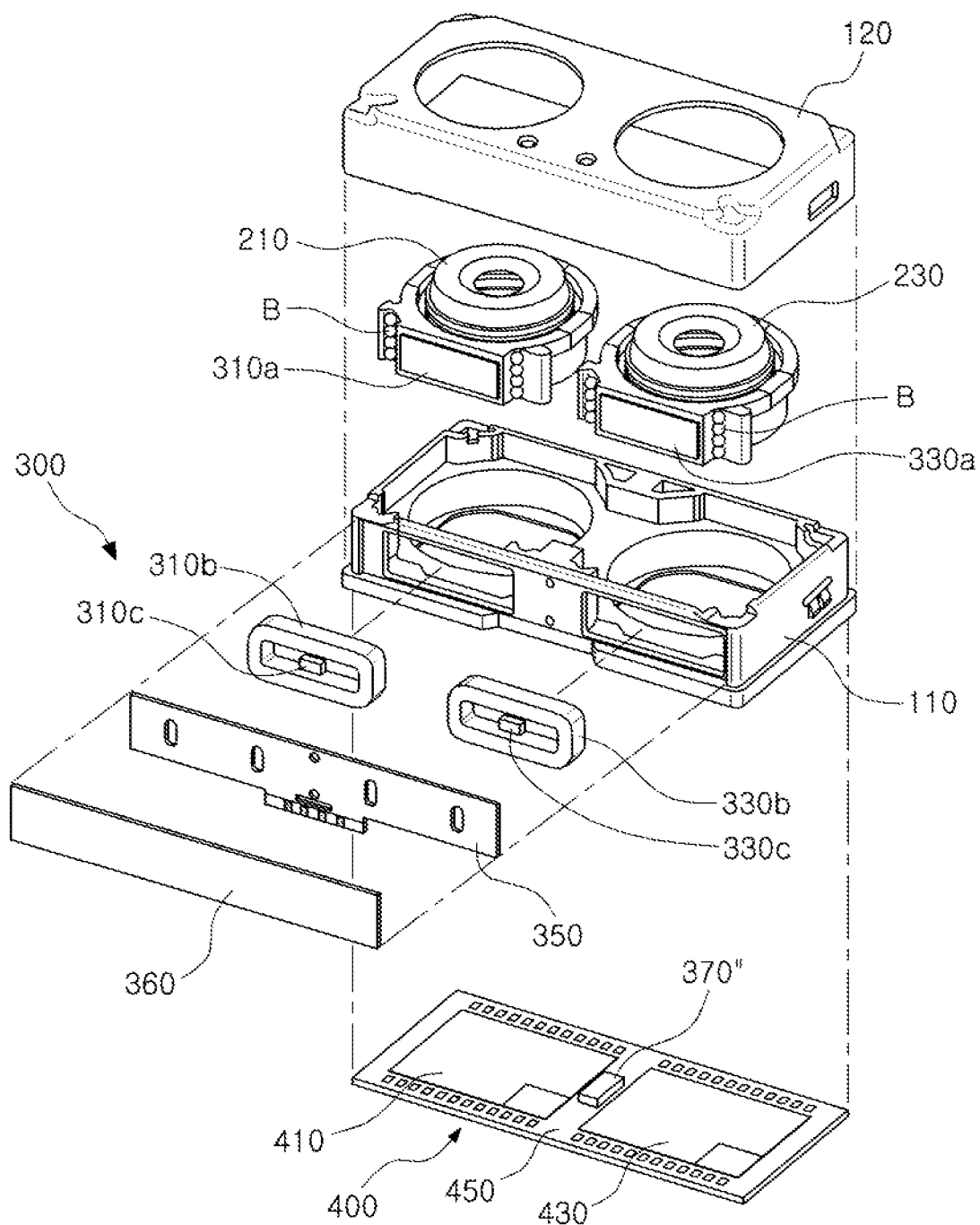
FIG. 7 is an exploded perspective view illustrating another example of a camera module.

FIG. 7 is an exploded perspective view illustrating another example of a camera module.

The example of the camera module illustrated in FIG. 7 is the same as the example of the camera module illustrated in FIG. 2 except for the position of a single controller 370". Accordingly, a description of components other than single controller 370" will be omitted.

Referring to FIG. 7, the single controller 370" is disposed in the image sensor module 400.

In the example illustrated in FIG. 7, the image sensor module 400 includes a printed circuit board 450 attached to the base 110, a first image sensor 410 and a second image sensor 430 connected to the printed circuit board 450, and the single controller 370" disposed on the printed circuit board 450.

The single controller 370" is disposed between the first image sensor 410 and the second image sensor 430.

The single controller 370" is disposed in a space between the first image sensor 410 and the second image sensor 430, thereby reducing a size of the camera module.

The single controller 370" applies power to the first coil 310b and the second coil 330b to control movement of the first lens module 210 and the second lens module 230.

In one example, the single controller 370" controls magnitudes of currents applied to the first and second coils 310b and 330b based on the positions of the first and second lens modules 210 and 230 sensed, respectively, by the first and second position sensors 310c and 330c.

As described above, the examples of the camera module described above have a reduced size, may be manufactured at a low cost, and enable an improved productivity in manufacturing despite using more than one lens module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a first lens module and a second lens module accommodated in the housing;
a printed circuit board attached to the housing;
an actuator disposed between the first and second lens modules and the housing and configured to move the first and second lens modules in an optical axis direction; and
a single integrated circuit disposed on the printed circuit board and configured to control movements of the first and second lens modules.

2. The camera module of claim 1, further comprising:
a substrate attached to a side surface of the housing; and
a first position sensor and a second position sensor disposed on one surface of the substrate and configured to sense positions of the first and second lens modules, respectively.

3. The camera module of claim 2, wherein the single integrated circuit is further configured to control magnitudes of currents applied to the actuator based on the positions of the first and second lens modules sensed, respectively, by the first and second position sensors.

4. The camera module of claim 2, wherein the side surface of the housing to which the substrate is attached is a side surface of the housing having a greatest length among surfaces of the housing.

5. The camera module of claim 2, wherein the actuator comprises:
a first magnet attached to one side surface of the first lens module;
a second magnet attached to one side surface of the second lens module; and
a first coil and a second coil disposed on one surface of the substrate facing the first and second magnets, respectively.

6. The camera module of claim 5, further comprising a yoke disposed on another surface of the substrate and configured to generate an attractive force in a direction perpendicular to the optical axis direction in cooperation with the first and second magnets.

7. The camera module of claim 1, further comprising ball members disposed between the first and second lens modules and the housing and configured to guide the movements of the first and second lens modules.

8. The camera module of claim 1, wherein the first and second lens modules have different fields of view.

9. The camera module of claim 1, wherein a shortest distance between an optical axis of the first lens module and an optical axis of the second lens module is less than a width of the housing.

10. The camera module of claim 1, further comprising a first image sensor and a second image sensor disposed on the printed circuit board;
wherein the single integrated circuit is disposed on the printed circuit board between the first image sensor and the second image sensor.

11. A camera module comprising:
a housing;
lens modules accommodated in the housing;
a substrate attached to the housing;
an actuator comprising:
magnets attached to the lens modules, respectively; and
coils disposed on the substrate facing the magnets, respectively; and
a single controller disposed on the substrate between the coils and configured to control the actuator to move the lens modules.

12. The camera module of claim 11, further comprising position sensors disposed on the substrate and configured to sense positions of the lens modules, respectively.

13. The camera module of claim 12, wherein the single controller is further configured to control magnitudes of currents applied to the coils based on the positions of the modules sensed, respectively, by the position sensors.

14. The camera module of claim 11, wherein the single controller is an integrated circuit in which a driver integrated circuit (IC) configured to apply driving signals to the coils, and position sensors configured to sense positions of the lens modules, are configured as a single chip.

15. The camera module of claim 14, wherein the magnets are disposed so that portions of the magnets face the single controller in a direction perpendicular to an optical axis direction.

16. A camera module comprising:
a housing;
a first lens module and a second lens module supported by the housing so that the first and second lens modules are independently movable in an optical axis direction;
an actuator configured to independently move the first and second lens modules in the optical axis direction; and
a single integrated circuit configured to control the actuator to independently move the first and second lens modules in the optical axis direction.

17. The camera module of claim 16, wherein the actuator comprises:
  a first magnet disposed on a surface of the first lens module;
  a second magnet disposed on a surface of the second lens module;
  a first coil facing the first magnet; and
  a second coil facing the second magnet; and
the camera module further comprises:
  a first position sensor configured to sense a position of the first lens module; and
  a second position sensor configured to sense a position of the second lens module;
  wherein the single integrated circuit is further configured to:
  apply a first driving signal to the first coil to move the first lens module in the optical axis direction based on the position of the first lens module sensed by the first position sensor, and
  apply a second driving signal to the second coil to move the second lens module in the optical axis direction based on the position of the second lens module sensed by the second position sensor.

18. The camera module of claim 17, further comprising a substrate supported by the housing;
  wherein the single integrated circuit, the first coil, the second coil, the first position sensor, and the second position sensor are disposed on the substrate.

19. The camera module of claim 18, wherein the single integrated circuit, the first position sensor, and the second position sensor are integrated into a single chip.

20. The camera module of claim 17, further comprising:
  a substrate supported by the housing; and
  a printed circuit board supported by the housing;
  wherein the first coil, the second coil, the first position sensor, and the second position sensor are disposed on the substrate; and
  the single integrated circuit is disposed on the printed circuit board.

* * * * *